United States Patent

[11] 3,582,843

| [72] | Inventor | Joseph D. Findley<br>Pittsburgh, Pa. |
|---|---|---|
| [21] | Appl. No. | 866,328 |
| [22] | Filed | Oct. 14, 1969 |
| [45] | Patented | June 1, 1971 |
| [73] | Assignee | Westinghouse Electric Corporation<br>Pittsburgh, Pa. |

[54] TRIPPING MEANS FOR HIGH SPEED CIRCUIT INTERRUPTERS
8 Claims, 7 Drawing Figs.

[52] U.S. Cl. .................................................. 335/21, 335/174
[51] Int. Cl. ........................................................ H01h 71/28
[50] Field of Search ............................................. 335/21, 22, 24, 174, 176, 6, 172, 274, 276

[56] References Cited
UNITED STATES PATENTS

| 3,181,041 | 4/1965 | Falk | 335/176 |
|---|---|---|---|
| 3,215,799 | 11/1965 | Clausing | 335/174 |
| 3,381,247 | 4/1968 | Gamel et al. | 335/174 |
| 3,391,361 | 7/1968 | Jencks et al. | 335/176 |

*Primary Examiner*—Harold Broome
*Attorneys*—A. T. Stratton and C. L. McHale

ABSTRACT: A circuit interrupter having a tripping means including a means which is responsive to a predetermined magnitude of current in the circuit to be protected which flows in an electrical conductor which forms part of the circuit interrupter. The latter means includes a magnetic beam member which is pivotally supported on an associated first magnetic member and includes a free end which is movable with respect to a second magnetic member in response to the changes in the current in the associated electrical conductor. A spring means which is operatively connected to the magnetic sheet member adjacent to the other end of the magnetic sheet member biases the free end of the magnetic sheet member away from the second magnetic member.

PATENTED JUN 1 1971

WITNESSES
Theodore F. Wrobel
James T. Young

INVENTOR
Joseph D. Findley, Jr.
BY
Clement L. McHale
ATTORNEY

TRIPPING MEANS FOR HIGH SPEED CIRCUIT INTERRUPTERS

BACKGROUND OF THE INVENTION

This invention relates to circuit interrupters and, more particularly to tripping means for such circuit interrupters.

In certain types of high speed, direct current circuit interrupters or circuit breakers which are intended primarily to protect circuits including semiconductor or other rectifier assemblies, the circuit interrupter must be made to open as quickly as possible when an abnormal operating condition or fault occurs in the circuit to be protected. For example, in the circuit interrupter disclosed in U.S. Pat. No. 3,381,247 which issued Apr. 30, 1968 to G. D. Gamel and J. B. Findley, Jr. the circuit interrupter includes both a first tripping means which responds primarily to a predetermined rate of rise of current in the circuit to be protected and a second tripping means which responds to a predetermined magnitude of current in the circuit to be protected independently of the rate of rise of the current. Although this combination of tripping characteristics has been found to be particularly desirable, certain difficulties have been encountered in adjusting the calibration of the second tripping means disclosed in the above-mentioned patent in order to actuate the tripping of the circuit interrupter at a particular magnitude of current in a predetermined range of overload or abnormal currents. It is believed that such difficulties are due to the fact that a plurality of stresses and forces are associated with the magnetic sheet member which forms part of the second tripping member, at least some of which are not readily controllable.

SUMMARY OF THE INVENTION

In accordance with the invention, a tripping means for a high speed circuit interrupter or circuit breaker comprises a pair of first and second magnetic members which are supported by an associated supporting means in spaced relation along a line which is generally transverse to an associated elongated electrical conductor which is connected electrically in series circuit relation with the main contacts of the circuit interrupter. A magnetic beam member is pivotally supported on a relatively narrow ridge portion of the first magnetic member and is disposed generally transversely with respect to the associated electrical conductor. The magnetic beam member extends between the first and second magnetic members. In order to bias a movable free end of the magnetic beam member away from the second magnetic member, a spring means, more specifically a coil spring, is operatively connected between the supporting means for the first and second magnetic members and the magnetic beam member adjacent to one end of the magnetic beam member opposite the free end thereof. When the free end of the magnetic beam member moves toward and away from the second magnetic member in response to changes in the current in the associated electrical conductor, a separable contact means provided is actuated by the movement of the magnetic beam between open and closed operating positions when the current increases to a predetermined magnitude. In a preferred arrangement or embodiment of the invention, a means is provided for adjusting the length of the spring means to whereby vary the predetermined current at which the separable contact means is actuated between operating positions in a substantially linear manner.

It is therefore an object of this invention to provide an improved tripping means for a high speed circuit interrupter.

BRIEF DESCRIPTION OF THE DRAWINGS

Other objects of the invention will be apparent from the following detailed description taken in conjunction with the accompanying drawings in which.

DESCRIPTION OF THE PREFERRED EMBODIMENTS

Figure 1:
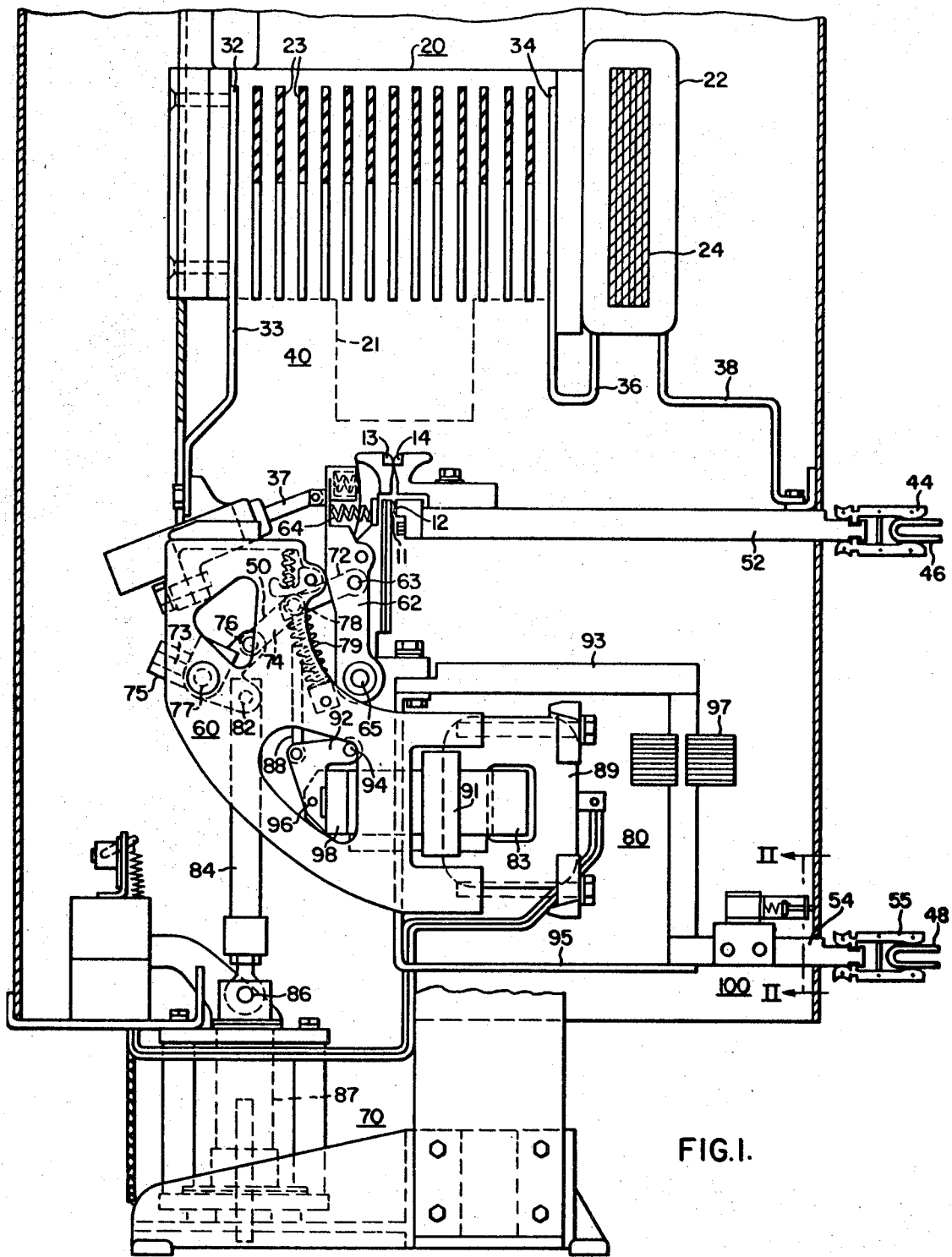
FIG. 1 is a side elevational view, partly in section, of a direct current circuit interrupter embodying the principles of the invention with the interrupter shown in the closed circuit position.

Referring now to the drawings and FIG. 1 in particular, there is illustrated a direct current circuit interrupter or circuit breaker of the drawout type which is particularly adapted for the protection of circuits including semiconductor rectifier assemblies and which would normally use rollers or wheels (not shown) to permit moving the circuit breaker into and out of an associated housing (not shown). The circuit interrupter shown in FIG. 1 comprises a pair of separable main contacts 11, 12 which are shunted or electrically connected in parallel with a pair of separable arcing contacts 13, 14 when the circuit interrupter is in the closed position, as shown in FIG. 1. The relatively stationary main contact 12 and the relatively stationary arcing contact 14 are mounted on and electrically connected to one end of the upper conducting stud 52 whose other end may engage a plurality of disconnecting fingers 44 which are biased inwardly by spring means (not shown) to engage both the conducting stud 52 and a terminal stud 46 which may be associated with a cell or housing structure (not shown). The movable main contact 11 and the movable arcing contact 13 are both resiliently mounted on and electrically connected to the upper end of a pivoted switch or contact arm 62 which is biased in an opening direction by a compression spring 39 through a connecting rod 37 which is pivotally connected to the upper end of the switch arm 62, as shown diagrammatically in FIG. 6. The lower end of the switch arm or contact arm 62 is pivotally mounted on a stationary pivot 65 which, in turn, is supported at one end of a conducting stud or bus bar 93 which also electrically connects the switch arm 62 to one end of the lower conducting stud 54, as shown in FIG. 1. The other end of the lower conducting stud 54, as illustrated, is engaged by a plurality of disconnecting fingers 55 which may also engage a terminal stud 48. A conductor 95 is electrically connected in parallel with the bus bar 93 and also passes through the holding magnet structure 80 which normally holds the switch arm 62 in the closed position shown in FIG. 1 through a first toggle means 50 and a second toggle means 60, which will be described in detail hereinafter.

In order to interrupt the arc which results when the separable contacts of the circuit interrupter shown in FIG. 1 are opened, the arc chute structure 40 is disposed above the separable contacts of the circuit interrupter. The arc chute 40 includes a plurality of spaced insulating plates 23 and a pair of spaced arc horns 32 and 34 which are disposed at the opposite ends of the arc chute 40. In order to draw the arc, which results when the separable contacts of the circuit interrupter are opened, upwardly into the arc chute 40, the blowout magnet structure 20 is disposed to cooperate with the arc chute 40 and comprises a magnetic core which includes a pair of side pole plates 21, only one of which is shown in FIG. 1, and a bight portion 24 on which a blowout coil 22 is inductively disposed. One end of the blowout coil 22 is electrically connected to the upper conducting stud 52 and the associated stationary contacts 12 and 14 through the connector 38, while the other end of the blowout coil 22 is electrically connected to the arc horn 34 through the connector 36 to be energized whenever the separable contacts of the circuit interrupter shown in FIG. 1 are opened to form an arc therebetween which is subsequently transferred to the arc horns 32 and 34. It is to be noted that the arc horn 32 at the left end of the arc chute 40, as viewed in FIG. 1, is electrically connected to the switch arm 62 and the movable contacts 11 and 13 through suitable conducting means (not shown).

In order to actuate the separable contacts of the circuit interrupter shown in FIG. 1 between the open and closed positions, the contact arm or switch arm 62 is operatively connected to the closing solenoid 70 and to the holding magnet 80 by the first toggle means 50 and the second toggle means 60. In particular, the first toggle means 50 includes a pair of toggle links 72, 74 which are pivotally connected at the knee joint or pivot pin 78. The right end of the toggle link 72 is pivotally connected, as indicated at 63, to the rotatable contact arm 62, while the left end of the other toggle link 74 is pivotally connected to the knee joint or picot pin 76 of the second toggle means 60. The second toggle means 60 comprises the toggle link 74 and a closing lever casting 75 which are pivotally connected at the pivot pin or knee joint 76. The lower end of the closing lever casting 75 is pivotally connected, as indicated at 82, to the upper end of a pull rod 84. The closing lever casting 75 is pivotally mounted on a fixed pivot 77 and has an opening 73 therein which is adapted to receive a manual closing handle (not shown). The pull rod 84 is pivotally connected at the lower end, as indicated at 86, to the armature 87 of the closing solenoid 70.

Figure 6:
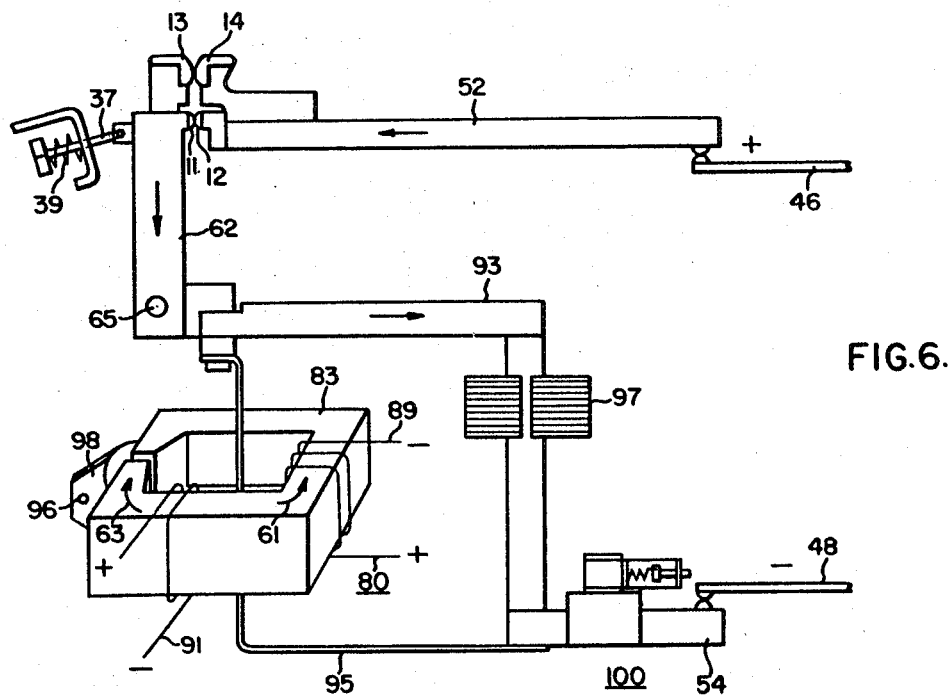
FIG. 6 is a diagrammatic representation of the circuit interrupter shown in FIG. 1 with many of the parts omitted to more clearly illustrate the operation of the circuit interrupter, the contacts of the circuit interrupter being shown in the closed circuit position.

In order to permit closing of the contact arm 62, either by manual rotation of the closing lever 75 or by energization of the closing solenoid 70, the knee pin 78 of the first toggle means 50 must be held in the position shown in FIG. 1 by the holding magnet 80. In particular, the knee pin 78 of the first toggle means 50 is pivotally connected by the connecting link 88 to the crank arm 92 which, in turn, is pivotally connected to the movable armature 98 of the holding magnet 80, as indicated at 96, and which is pivotally supported by a fixed pivot pin 94, as shown in FIG. 1. The knee pin 78 of the first toggle means 50 is biased upwardly in a direction tending to collapse the first toggle means 50 by the compression spring 79 which is disposed between the knee pin 78 and a fixed spring support but is normally restrained from such upward movement by the force exerted on the knee pin 78 by the holding magnet 80 through the crank arm 92 and the connecting link 88 as long as the armature 98 of the holding magnet 80 is held in an attracted position with respect to the associated generally U-shaped or C-shaped stationary magnet structure 83, as best shown in FIG. 6. In order to hold the armature 98 of the holding magnet 80 in the attracted position, as shown in FIGS. 1 and 6, a holding coil 89 is inductively disposed on the stationary magnet structure 83 of the holding magnet 80 and may be normally energized from a source of direct current power or voltage, as indicated at the terminals P1 and P2 in FIG. 7, through a series resistor 224 and the normally closed contacts CS of a suitable manually operable control switch (not shown).

Considering the operation of the operating mechanism of the circuit interrupter shown in FIG. 1, it is to be noted that the second toggle means 60 is overcenter in the closed circuit position of the circuit interrupter shown in FIG. 1 but that the second toggle means 60 is prevented from moving further by the compressive force present in the pull rod 84 when the armature or plunger 87 of the closing solenoid 70 hits the bottom of the closing solenoid 70. In this operating condition of the circuit interrupter, the first toggle means 50 does not go overcenter, but the toggle means 50 cannot collapse as long as the armature 98 is held by the magnetic attraction of the holding magnet 80. When however, the armature 98 of the holding magnet 80 is released in response to the actuation of an associated tripping means which will be described hereinafter, the knee pivot pin 78 of the first toggle means 50 will move upwardly under the influence of the spring 79 which causes the first toggle means 50 to collapse and the contact arm 62 will be pulled open by the compression spring 39 shown in FIG. 6. When the contact arm 62 is actuated from the closed position shown in FIG. 1 to the open position, the knee pin 76 of the second toggle means 60 remains nearly stationary until the contact arm 62 reaches the open position. Then the knee pin 76 of the second toggle means 50 is moved upwardly by a biasing spring (not shown) which is provided in the closing solenoid 70 to apply an upwardly biasing force to the armature 87 of the closing solenoid 70. It is to be noted that when the contact arm at 62 is actuated from the closed position shown in FIG. 1 to the open position, the main contacts 11, 12 will separate prior to the arcing contacts 13, 14. When the arcing contacts 13, 14 separate, the arc drawn therebetween will move upwardly and transfer to the arc horns 32, 34 and will then move further into the arc chute 40 in which arc extinction will occur. The magnetic field set up between the two pole plates 21 of the blowout magnet structure 20 by energization of the blowout coil 22 will assist the upward movement of the arc along the arc horns 32, 34.

In order to actuate the release of the armature 98 of the holding magnet 80 and to thereby open the separable contacts of the circuit interrupter shown in FIG. 1 in response to a relatively rapid rate of change or rise with respect to time of the current which is flowing in the circuit to which the circuit interrupter is connected and which flows through the separable contacts of the circuit interrupter, the circuit interrupter shown in FIG. 1 includes a first tripping means which comprises the conductor or bucking bar 95 which passes through the holding magnet 80 and the laminated magnetic structure 97 which includes one or more predetermined air gaps and which is disposed in inductive relation with the main current carrying conductor 93 of the circuit interrupter. It is to be noted that only a portion of the current which flows through the circuit interrupter shown in FIG. 1 between the upper and lower conducting studs 52 and 54, respectively, flows through the bucking bar 95 since the resistance of the conducting path which includes the conductor 93 is relatively much lower than the resistance of the conducting path which includes the bucking bar 95. It is also to be noted that the magnetic flux which is produced in the holding magnet 80 due to the magnetomotive force which results when current flows in the bucking bar 95 opposes the magnetic flux which is produced by the magnetomotive force that results when current flows in the conductor turns of the holding coil 89. During normal operating conditions when the rate of rise of the current which flows through the separable contacts of the circuit interrupter does not exceed a desired predetermined value, such as 500,000 amperes per second, the magnetomotive force which results due to current flow in the holding coil 89 is arranged to be several times greater than the magnetomotive force which results due to current flow in the bucking bar or conductor 95 in order that the armature 98 of the holding magnet 80 be held in the attracted position shown in FIGS. 1 and 6.

In the operation of the first tripping means just described, when the rate of rise of the current which flows through the separable contacts of the circuit interrupter shown in FIG. 1 exceeds a predetermined value, such as 500,000 amperes per second, a large change in the magnetic flux in the laminated magnetic structure 97 which is disposed around the main conductor 93 will result with a corresponding induced voltage in the portion of the main conductor 93 which passes through the magnetic structure 97. This induced voltage in the main conductor 93 is electrically in parallel with the bucking bar 95 and will produce a high momentary current through the bucking bar 95 which will increase the corresponding magnetomotive force due to current flow in the bucking bar 95 which opposes that due to current flow in the holding coil 89 to cause the armature 98 to be released and the separable contacts of the circuit interrupter to open. It is to be noted in FIG. 6 that in the disclosed arrangement, the first tripping means just described will actuate the tripping of the circuit interrupter in response to a predetermined rate of rise of current through the disclosed circuit interrupter in the forward direction as shown in FIG. 6. It is to be noted that in certain applications, the first tripping means described may be arranged to respond to a predetermined rate of rise of the current through the circuit interrupter in the reverse direction rather than to a predetermined rate of rise of current in the forward direction. It is also to be noted that the available energy or power to actuate the release of the armature 98 of the holding magnet 80 varies with the degree to which the rate of rise of the current which flows through the circuit interrupter exceeds the predetermined rate or rise necessary to cause the release of the armature 98 and that the available energy will be relatively less when the rate of rise of the current is only slightly greater than the predetermined rate of rise to which the first tripping means is arranged to respond than when the rate of rise exceeds the predetermined value by a larger margin.

In order to actuate the release of the armature 98 of the holding magnet 80 in response to a predetermined magnitude of current through the separable main contacts of the disclosed circuit interrupter independently of the rate of rise of the current therethrough, the second tripping means 100 is disposed adjacent to one of the main electrically conducting paths through the circuit interrupter which in this case is the lower conducting stud 54 on which the second tripping means 100 is mounted or disposed. Referring to FIGS. 2 through 5, the second tripping means or current responsive device 100 comprises a pair of spaced magnetic members 112 and 114 which are disposed along a line which extends generally transversely with respect to the associated electrical conductor 54 and, as illustrated, is spaced from the conductor or bus bar 54 to concentrate a portion of the magnetic flux which results around the conductor 54 when current flows therethrough. The magnetic members 112 and 114 are formed from a suitable soft magnetic material, such as iron or magnetic steel.

In order to support the magnetic members 112 and 114 in a predetermined spaced relation adjacent to the conductor 54, the second tripping means 100 includes a housing or supporting means in which the magnetic members 112 and 114 are disposed at the opposite ends thereof. The housing of the second tripping means 100 comprises a front wall member 136 which, as illustrated, is formed from a nonmagnetic metallic material, such as brass, a rear wall member 134 which is formed from an electrically insulating material and a pair of upper and lower insulating covers 172 and 174, respectively, which are formed from an electrically insulating material, such as glass-polyester material. The front wall member 136 and the rear wall member 134 are secured together along with the associated magnetic members 112 and 114 by suitable means, such as the bolts 137, which pass through openings in the respective parts. The upper and lower insulating covers 172 and 174, respectively, are secured to the associated magnetic members 112 and 114 by suitable means, such as the bolts 135. In order to secure the housing of the second tripping means 100 to the associated conductor 54 to thereby support the second tripping means 100 on the conductor 54 as illustrated, a pair of spaced supporting members or brackets 138 may be secured to the associated housing at the opposite ends thereof by the bolts 135 and the supporting members 138 may in turn, be secured to the conductor 54 by suitable means, such as the bolts 139.

Figure 2:
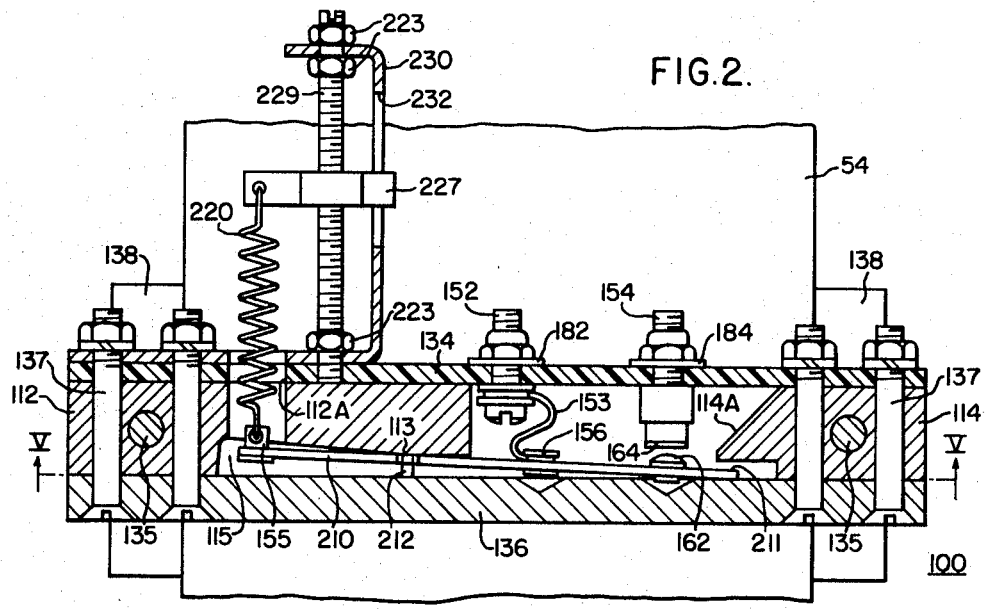
FIG. 2 is a top plan view, partly in section, of a current responsive device or tripping means which forms part of the circuit interrupter shown in FIG. 1.
Figure 3:
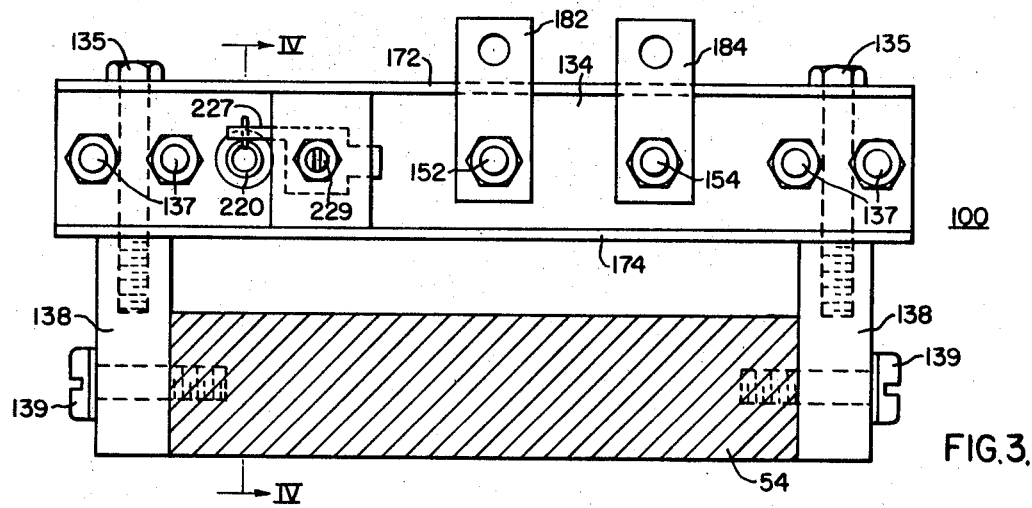
FIG. 3 is an elevational view, partly in section, of the tripping means shown in FIG. 2.
Figure 4:
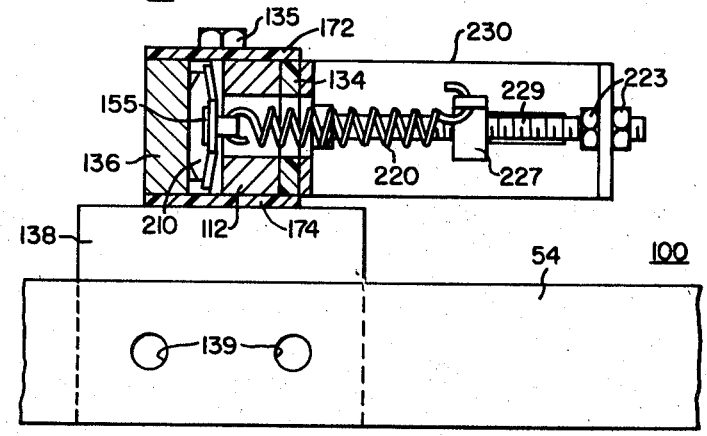
FIG. 4 is a side elevational view, partly in section, taken along the lines IV—IV in FIG. 3.
Figure 5:
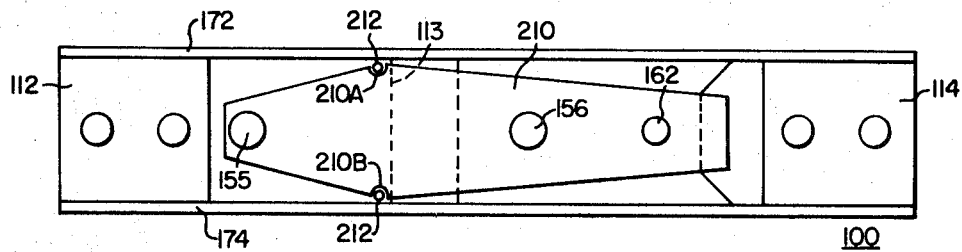
FIG. 5 is a front elevational view, partly in section, taken along the lines V—V in FIG. 2.

In order to actuate a pair of separable contacts 162 and 164 between open and closed operating conditions when the current in the bus bar or conductor 54 increases to a predetermined value, a magnetic beam member 210 is disposed in the housing just described and extends or generally bridges the distance or spacing between the magnetic members 112 and 114. The magnetic beam member 210 may be formed of a suitable soft magnetic material, such as iron or magnetic steel. As best shown in FIG. 2, the magnetic beam member 210 is pivotally supported by the magnetic member 112 which includes a relatively narrow ridge portion as indicated at 113 which bears against the magnetic beam member 210 intermediate the ends of the magnetic sheet member 210. The magnetic member 112 also includes a recess as indicated at 115 to permit limited pivotal movement of the magnetic beam member 210 during the operation of the second tripping means 100, as will be described hereinafter. The free end of the magnetic beam member 210 which is disposed away from the magnetic member 112 and which is disposed adjacent to the magnetic block or member 114 is normally spaced away from the magnetic member 114 by a predetermined airgap or nonmagnetic gap as indicated at 211 in FIG. 2. It is important to note that the pivot support provided by the relatively narrow ridge portion 113 of the magnetic member 112 results in relatively very low frictional forces being exerted on the magnetic beam member 210 by the magnetic member 112. As best shown in FIG. 5, the magnetic beam member 210 includes a pair of recesses 210A and 210B at the opposite sides of the beam member 210 adjacent to the relatively narrow ridge portion 113 of the magnetic member 112 on which the magnetic sheet member 210 is pivotally supported. In order to assist in guiding the pivotal movement of the magnetic beam member 210 and to assist in retaining the magnetic beam member 210 in the proper operating position, as assembled in the overall second tripping means 100, a pair of guide pins 212 is mounted on the inner surface of the front wall member 136 as best shown in FIGS. 2 and 5 to project into the respective recesses 210A and 210B.

The separable contact means which is actuated by the movement of the free end of the magnetic beam member 210 includes a movable contact 162 which is secured to the magnetic sheet member 210 adjacent to the free end thereof and, as illustrated, is normally spaced away from or in an open position with respect to an associated relatively stationary contact member 164 which is mounted at the inner end of a terminal member 154 which, in turn, is mounted on the rear wall member 134. A second terminal member 152 is mounted on the rear wall member 134 and is spaced from the first terminal member 154 as shown in FIG. 2. The second terminal member 152 is electrically connected to the magnetic beam member 210 at a location or point which is spaced from the movable contact 162 by a very flexible, electrically conducting lead 153 which is secured to the magnetic beam member 210 by suitable means, such as the copper rivet 156, in order to minimize or substantially eliminate any force exerted on the magnetic beam member 210 by the electrical lead 153. The spacing between the separable contacts 162 and 164 corresponding to a particular operating position of the free end of the magnetic beam member 210 is preferably less than the spacing between the free end of the beam member 210 and the magnetic block 114 in order to insure that the contacts 162 and 164 properly close or engage when the free end of the beam member 210 is magnetically attracted to engage the magnetic block 114.

In order to normally actuate the free end of the magnetic beam member 210 to an operating position which is spaced away from the magnetic member 114 by a predetermined airgap or nonmagnetic gap and to apply a biasing force to the magnetic beam member 210 in a direction which is generally transverse to the magnetic beam member 210 and at a location which is adjacent to the end of the magnetic beam member 210 away from the free end on the other side of the relatively narrow ridge portion 113 of the magnetic member 112, the second tripping means 100 includes a biasing tension spring 220 which is of the coil type as illustrated and which is formed from a suitable nonmagnetic material, such as a nonmagnetic type of stainless steel. In general, the biasing spring 220 is operatively connected between the magnetic beam member 210 adjacent to one end thereof and the housing of the second tripping means 100 which includes the rear wall member 134 through the supporting bracket 230 and the threaded stud member 229. More specifically, the lower end of the spring 220 as viewed in FIG. 2 is operatively connected to the magnetic beam member 210 by suitable means such as the rivet 155 which is formed from a suitable nonmagnetic material, such as copper. It is to be noted that the spring 220 passes through an opening 112A in the magnetic member 212 which extends through the magnetic member 112 in a direction which is generally transverse to the magnetic beam member 210. The upper end of the spring 220 is connected to an internally threaded supporting member 227 which in turn is movably supported on the threaded supporting stud member 229 which is also preferably formed from a suitable nonmagnetic material, such as brass. The stud member 229 which projects away from the rear wall member 134, as shown in FIG. 2, is supported, in turn, by the generally J-shaped supporting bracket 230 which, in turn, is secured to and supported by the rear wall member 134 with the relatively longer lower portion of the bracket member 230 being secured to the rear wall member 134 by the bolts 137 and the stud member 222. The bracket member 230 is preferably formed from a suitable nonmagnetic material, such as brass. In order to lock the supporting member 227 in any particular desired position on the associated stud member 229, suitable means, such as the nuts 223, may be disposed on the stud member 229 as shown in FIG. 2.

In order to permit adjustment of the position of the supporting member 227 on the stud member 229 which is limited by the size of the opening or recess 232 provided in the bracket member 230 into which a portion of the supporting member 227 projects, the nuts 223 on the stud member 229 may first be loosened or untightened to permit rotation of the stud member 229 in place. A suitable tool, such as a screwdriver may then be inserted into the slot provided at the upper end of the stud member 229 as viewed in FIG. 2 to rotate the stud member 229 to thereby actuate the supporting member 227 either in an upward or downward direction as viewed in FIG. 2. When the position of the supporting member 227 is adjusted upwardly or downwardly on the stud member 229 as just described, the effective length of the tension spring 220 is adjusted correspondingly and the biasing force exerted by the spring 220 on the magnetic beam member 210 may be adjusted in a substantially linear manner to thereby vary the corresponding predetermined current at which the magnetic sheet member 220 pivotally moves to close the separable contacts 162 and 164.

It is important to note that substantially the only forces exerted on the magnetic sheet member 210 during the operation of the second tripping means 100 are the biasing force on the magnetic beam member 210 by the tension spring 220 and the magnetic force exerted on the magnetic beam member 210 against the influence of the biasing force exerted by the spring 220. The latter magnetic force varies with the magnetic flux which results when current flows in the conductor or bus bar 54. As indicated previously, any frictional forces exerted on the magnetic beam member 210 by the magnetic member 112 at the relatively narrow ridge portion 113 are relatively very low and any slight force exerted on the magnetic beam member 210 by the electrical lead 153 from the terminal 152 is substantially negligible. It is to be noted that the portion of the front wall member 136 against which the free end of the magnetic sheet member 210 bears during the normal operation of the second tripping means 100 acts as a stop to limit the clockwise movement of the free end of the magnetic beam member 210 under the influence of the force exerted on the magnetic beam member 210 by the biasing spring 220 about the pivot support 113 on the magnetic member 112.

In the operation of the second tripping means 100, when the current in the bus bar or conductor 54 exceeds a predetermined value or magnitude and the magnetic flux which is produced thereby in the magnetic beam member 210 exceeds a corresponding value, the free end of the magnetic beam member 210 will be magnetically attracted toward the magnetic member 114 against the influence of the force exerted on the magnetic beam member 210 by the spring 220 and the magnetic beam member 210 will move pivotally toward the magnetic member 114 until the free end of the magnetic beam member 210 engages the magnetic member 114 to thereby close the separable contacts 162 and 164 of the second tripping means 100. When the contacts 162 and 164 close, the trip coil 91 of the circuit interrupter shown in FIG. 1 as illustrated schematically in FIG. 7 will be energized from the source of direct current power indicated at the terminals P1 and P2 through the contacts 162 and 164, the resistor 222 and the auxiliary contacts AC which are actuated between a closed position when the separable contacts of the circuit interrupter shown in FIG. 1 are closed and an open position when the separable contacts of the circuit interrupter are open. It is to be noted that the current which passes through the second tripping means 100 flows from the terminal connector 182 which is mounted on the first terminal member 152, the electrical lead 153, the magnetic beam member 210, the movable contact 162, the relatively stationary contact 164, and the terminal member 154 to the terminal connector 184 which is mounted on the terminal member 154. The magnetic member 114 is beveled adjacent to the stationary contact 164, as indicated at 114A, to increase the electrical creepage path or distance between the magnetic member 114 and the stationary contact 164 to thereby substantially eliminate the possibility of a flashover between the magnetic beam member 210 to the magnetic member 114 and from the magnetic member 114 to the stationary contact 164.

It is important to note that since most of the magnetic flux path provided by the second tripping means around the conductor 54 is through air or other nonmagnetic materials and only a relatively small portion of the magnetic flux path around the conductor 54 is through the magnetic beam member 210 and the members 112 and 114, the magnetic flux which passes through the magnetic beam member 210 will more closely follow in time any changes in the current which flows in the conductor 54 because of the much smaller eddy currents and hysteresis currents in the magnetic flux path provided through the second tripping means 100. In addition, the mechanical inertia of the magnetic beam member 210 is relatively low to thereby increase the speed of response of the second tripping means 100 when the predetermined current in the conductor 54 is exceeded. The impedance of the trip coil 91 to which the contacts 162 and 164 of the second tripping means 100 are electrically connected should also have a relatively low impedance to increase the speed of the tripping action in the overload circuit interrupter shown in FIG. 1. As shown in FIG. 6, when the tripping coil 91 is energized, the magnetic flux is produced by the magnetomotive force due to the current flow through the tripping coil 91 opposes the magnetic flux produced by the current flow in the holding coil 89 to thereby reduce the magnetic flux which is effective to hold the armature 98 in the attracted position and to release the armature 98 and to actuate the opening of the seperable main contacts of the circuit interrupter shown in FIG. 1 as previously described.

In calibrating the second tripping means 100, the bracket member 230 may be calibrated in a substantially linear manner along the opening 232 provided in the bracket member 230 to correspond to different positions of the supporting member 224 to which the supporting member 227 may be adjusted by the rotation of the stud member 229. The different positions of the supporting member 224 correspond to different predetermined currents at which the contacts 162 and 164 of the second tripping means 100 will close to thereby actuate the tripping or opening of the circuit interrupter shown in FIG. 1. In other words, the supporting member 227 may be provided with an index mark on the portion which projects into the opening 232 of the bracket member 230 and the bracket member 230 may be provided with a plurality of spaced marks adjacent to the opening 232 which correspond to different values of predetermined current to which the second tripping means 100 can be adjusted to respond by the rotation of the stud member 229 to thereby close the separable contacts 162 and 164. When the stud member 229 is adjusted so that the supporting member 227 moves upwardly or downwardly on the stud member 229 with the index mark on the supporting member 227 substantially aligned with a particular mark on the bracket member 230 adjacent to the opening 232 the predetermined current to which the second tripping means 100 responds may be varied in a substantially linear manner to greater or lesser values as desired within a predetermined range of abnormal currents. For example, the tripping current to which the second tripping means 100 responds may be conveniently adjusted by the rotation of the stud member 229 to be between 100 percent and 200 percent of a desired minimum tripping current.

Figure 7:
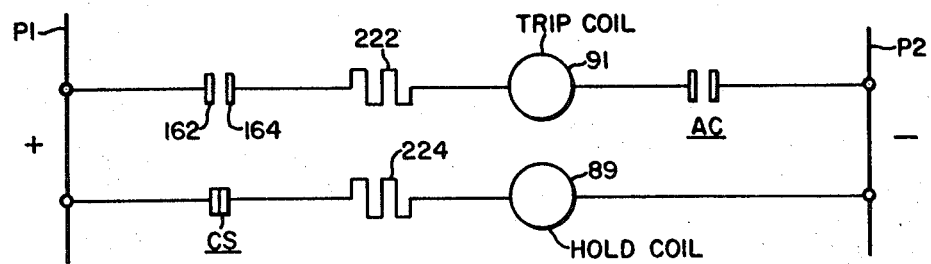
FIG. 7 is a schematic drawing illustrating the electrical connections of the tripping means which form part of the circuit interrupter shown in FIG. 1 to an associated source of direct current power.

It is important to note that the tripping of the circuit interrupter shown in FIG. 1 by the second tripping means 100 is accomplished independently of the first tripping means 80 previously described since the armature 98 of the holding magnet 80 will be released independently whenever a predetermined rate of rise or change with respect to time occurs in the current which flows through the separable main contacts of the circuit interrupters shown in FIG. 1 or when said current exceeds a predetermined value or magnitude which is determined by the operating characteristics of the second tripping means 100 just described. It is also important to note that the energy available to actuate the tripping of the circuit interrupter shown in FIG. 1 in response to a predetermined magnitude of value of current which flows through the separable main contacts of the circuit interrupter as determined by the second tripping means 100 is independent of the magnitude of the current to which the second tripping means 100 responds since the energy for the tripping coil 91 is obtained from a separate source of direct current power or voltage as shown in FIG. 7 and is independent of the magnitude of the overcurrent or fault current to which the second tripping means 100 is adjusted to respond.

It is to be understood that the second tripping means 100 as disclosed may be employed in certain applications as the only tripping means in a particular circuit interrupter where it is desired that the circuit interrupter be automatically tripped or opened only in response to a predetermined magnitude of current rather than also responding independently to a predetermined rate of rise in the current in the circuit being protected. It is also to be understood that a second tripping means or current responsive device 100 as disclosed may be employed to actuate other control operations rather than to actuate the tripping of a circuit interrupter as disclosed.

The apparatus embodying the teachings of this invention has several advantages. For example, a circuit interrupter including a second tripping means as disclosed provides ease of calibration in a substantially linear manner since the only significant forces acting on the magnetic beam member in the disclosed construction of the second tripping means are the biasing force exerted by the tension spring 220 and the magnetic force exerted on the magnetic sheet member due to the magnetic flux which varies with the current flow in the associated conductor or bus bar 54. Any additional forces exerted on the magnetic beam member 210 as described are of relatively very low values or negligible. Another important advantage of the invention is the repeatable accuracy of the operation of the second tripping means. In addition, it has been found that the speed of response of the second tripping means 100 which is responsive to a predetermined magnitude of current is relatively fast compared with known methods for actuating the tripping of a direct current circuit breaker in response to fault currents of a particular type. As previously mentioned, the fast speed of response of the second tripping means as disclosed is due in part to the fact that the magnetic flux path around the conductor 54 is through the relatively short length of the magnetic beam member 210 and the magnetic members 112 and 114 and through the relatively long length of air or other nonmagnetic materials which complete the magnetic flux path around the conductor 54. In addition, the fast speed of response is due to the fact that the mechanical inertia of the magnetic beam member 210 is relatively low compared with the magnetic forces acting on the magnetic beam member 210 in the disclosed construction of the second tripping means 100. A further advantage of the invention as disclosed is the compact construction of the second tripping means as exemplified by the arrangement of the bias spring which passes through an opening in the associated magnetic member 112. Finally, the energy available to actuate the release of the armature and the holding magnet structure as disclosed in response to the operation of the second tripping means 100 is independent of the magnitude of the overcurrent or fault current to which the second tripping means 100 is adjusted to respond.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A circuit interrupter comprising a pair of relatively movable main contacts, a conducting member connected in series circuit relation with the main contacts, operating means for actuating the main contacts between open and closed positions, first means responsive to the current through the main contacts to automatically actuate the operating means to open the main contacts when the rate of rise of the current exceeds a predetermined value, and second means responsive to the current through the main contacts to automatically actuate the operating means to open the main contacts when the magnitude of the current exceeds a predetermined value independently of the rate of rise of the current, said second current responsive means comprising first and second magnetic members, means for supporting the magnetic members in spaced relation along a line which extends generally transversely to said conducting member, a magnetic beam member disposed generally along said line and extending between said magnetic members, said first magnetic member including a relatively narrow ridge portion disposed to bear against and to pivotally support said magnetic beam member intermediate the ends thereof, spring means operatively connected between said supporting means and said magnetic beam member adjacent to one end thereof to bias the opposite free end of said magnetic sheet member away from said second magnetic member, and separable contact means disposed to be actuated between open and closed positions by the pivotal movement of the free end of the magnetic beam member toward and away from said second magnetic member in response to changes in the current in said conducting means.

2. The combination as claimed in claim 1 wherein an additional means is provided for adjusting the length of said spring means to thereby vary in a substantially linear manner the magnitude of current in said conductor at which the pivotal movement of said magnetic beam member actuates said separable contact means to one of the operating positions.

3. The combination as claimed in claim 1 wherein said spring means comprises a coil held in tension and disposed generally transversely with respect to said magnetic beam member to pass through an opening provided in said first magnetic member.

4. The combination as claimed in claim 1 wherein said separable contact means includes a relatively movable contact member mounted on said magnetic beam member adjacent to said free end thereof for movement therewith.

5. A current responsive device adapted to be mounted adjacent to a current carrying conductor comprising first and second magnetic members, means for supporting the magnetic members in spaced relation along a line which is generally transverse to the conductor, a magnetic beam member disposed generally transversely with respect to said conductor and extending between said magnetic members, said first magnetic member including a relatively narrow ridge portion disposed to bear against and to pivotally support said magnetic beam member intermediate the ends thereof, spring means operatively connected between said supporting means and said magnetic beam member adjacent to one end thereof to bias the opposite free end of said magnetic beam member away from said second magnetic member, and separable contact means disposed to be actuated between open and closed operating positions by the pivotal movement of the free end of the magnetic beam member toward and away from said second magnetic member in response to changes in the current in said conductor.

6. The combination as claimed in claim 5 wherein an additional means is provided for adjusting the length of said spring means to thereby vary in a substantially linear manner the magnitude of current in said conductor at which the pivotal movement of said magnetic beam member actuates said separable contact means between said operating positions.

7. The combination as claimed in claim 5 wherein said spring means comprises a coil held in tension and disposed generally transversely with respect to said magnetic beam member to pass through an opening provided in said first magnetic member.

8. The combination as claimed in claim 5 wherein said separable contact means includes a relatively movable contact member mounted on said magnetic beam member adjacent to said free end thereof for movement therewith.